United States Patent Office 3,261,869
Patented July 19, 1966

3,261,869
METHOD FOR THE PRODUCTION OF BENZYL ANILINES
Grannis S. Johnson, Englewood, and David E. Graham, Westfield, N.J., assignors to General Aniline & Film Corporation, New York, N.Y., a corporation of Delaware
No Drawing. Filed Sept. 9, 1963, Ser. No. 307,298
15 Claims. (Cl. 260—570.9)

The present invention relates, in general, to improved methods for the reductive amination of aromatic aldehydes, and, in particular, relates to an improved method for the production of benzyl anilines of improved quality and yield by the catalytic reduction of aromatic nitro compounds in the presence of aromatic aldehydes.

While it is known to produce anilines by the catalytic hydrogenation of nitrobenzenes and to produce benzal anilines by the condensation of anilines with aldehydes as well as to produce benzyl anilines by the catalytic hydrogenation of benzal anilines, in separate steps previous attempts to combine these three steps into an economical one-step method have resulted in procedures which are characterized by low yields due to side reactions resulting in impure products. For example, it has been reported by Emerson and Mohrman, J. Am. Chem. Soc., 62, 69 (1940) that the preparation of benzyl anilines, for example, by the catalytic hydrogenation of nitrobenzene in ethanol over a Raney nickel catalyst in the presence of benzaldehyde resulted in a 33% yield of product.

Accordingly, it is an object of this invention to provide an improved method for the reduction of amination of aromatic aldehydes.

A further object of this invention resides in the provision of improved methods of producing benzyl anilines.

Yet another object of this invention is to provide an improved one-step process for the production of benzyl anilines by the catalytic reduction of aromatic nitro compounds in the presence of aromatic aldehydes.

The attainment of one or more of the objects of the invention is readily accomplished by methods which comprise catalytically hydrogenating an aromatic nitro compound in the presence of an excess of an aromatic aldehyde.

The reaction whereby benzyl anilines can be produced in accordance with the methods of the invention may be schematically illustrated, in the case of benzaldehyde and a nitrobenzene, as follows:

(a) $C_6H_5NO_2 + 3H_2 \rightarrow C_6H_5NH_2 + 2H_2O$
(b) $C_6H_5NH_2 + OHCC_6H_5 \rightarrow C_6H_5N=CHC_6H_5$
(c) $C_6H_5N=CHC_6H_5 + H_2 \rightarrow C_6H_5NHCH_2C_6H_5$ The methods of the invention are of wide general applicability with respect to the starting materials which can be employed therein. The usable aromatic starting materials may be represented by the formula:

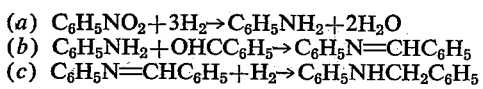

wherein $k$ is 1–3, $m$ is 0–3, X is methyl and Z is hydrogen, hydroxyl or amino. For example, any suitable aromatic nitro compound can be employed such as, for example, nitrobenzene, meta-dinitrobenzene, ortho-dinitrobenzene, para-dinitrobenzene, s-trinitrobenzene, as-trinitrobenzene, ortho-nitrotoluene, para-nitrotoluene, meta-nitrotoluene, 2,4-dinitrotoluene, 2,6-dinitrotoluene, 2,4,6-trinitrotoluene, 4-nitro-meta-xylene, nitro mesitylene, ortho-nitrophenol, meta-nitrophenol, para-nitrophenol, 2,3-dinitrophenol, 2,6-dinitrophenol, 3,4-dinitrophenol, 3,5-dinitrophenol, 2,4,6-trinitrophenol, ortho-nitroaniline, meta-nitroaniline, para-nitroaniline and the like. A preferred class of aromatic nitro compounds are the mono-nitrobenzenes.

Similarly, any aromatic aldehyde, whether containing one or more substituents in the aryl nucleus, is operative for purposes of the invention. Thus, the aromatic aldehyde may have the formula:

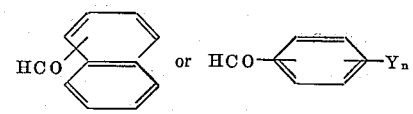

wherein $n$ is 0–2 and Y is hydrogen, chloro, bromo, methyl or methoxy. Such aldehydes include aromatic aldehydes such as benzaldehyde, ortho-chlorobenzaldehyde, meta-chlorobenzaldehyde, para-chlorobenzaldehyde, 2,4-dichlorobenzaldehyde, 2,5-dichlorobenzaldehyde, 2,6-dichlorobenzaldehyde, ortho-bromobenzaldehyde, meta-bromobenzaldehyde, para-bromobenzaldehyde, ortho-toluylaldehyde, meta-toluylaldehyde, para-toluylaldehyde, ortho-methoxybenzaldehyde, para-methoxybenzaldehyde, naphthaldehyde, terephthaldehyde; in general monocyclic aromatic aldehydes are preferred.

As pointed out above, the present invention is based on the discovery that substantial improvements in yield and quality of product are obtained by conducting the reaction in an excess of aromatic aldehyde. To this end, the molar ratio of aromatic aldehyde to aromatic nitro compound should be about 3.0:1.0 although greater amounts of aromatic aldehyde can be employed if desired.

The hydrogenation catalyst employed in the methods of the invention is not necessarily a critical feature and may be selected from one or more of the various Group VI and Group VIII metals as well as the oxides and sulfides thereof, representative materials being the oxides and sulfides of molybdenum, tungsten, chromium and the like, together with such metals as nickel or cobalt and the various oxides and sulfides thereof. Also suitable as hydrogenation catalysts are certain Group I(B) or Group II(B) metals such as copper or cadmium and their oxides and sulfides. If desired, more than one hydrogenation catalyst can be employed, such as two or more of the oxides and/or sulfides of molybdenum, cobalt, nickel, copper, chromium and zinc. However, other hydrogenation catalysts such as active metals or oxides may be used. Thus, for example, Raney nickel or reduced nickel, with or without suitable support or carrier, such as kieselguhr, majolica, alumina and the like may be employed. Preferred hydrogenation catalysts for use in the methods of the present invention are platinum, platinum oxide, platinum or palladium on charcoal or supported cobalt, as well as a supported nickel catalyst.

The temperature at which the reaction is carried out can be any convenient temperature since this has not been found to be necessarily critical with respect to the operation of the methods of the invention. Preferably, an elevated temperature of about 75° C. to about 200° C. will provide satisfactory results.

The reaction is carried out at a superatmospheric pressure. Any superatmospheric pressure can be employed since the reaction apparently has no hydrogen pressure requirement, thus low hydrogen pressures can be employed. Preferably, the hydrogen pressure employed in carrying out the reaction is about 75 pounds per square inch gauge although pressures above and below can be employed if desired. In general, a superatmospheric pressure in the range of from 50 to 500 pounds per square inch gauge will suffice.

In carrying out the reaction, the reactants and catalysts are charged to a pressure resistant vessel. The pressure resistant vessel is subsequently purged with nitrogen and/or hydrogen. The contents thereof are then heated to an elevated temperature as described above, and hydrogen applied at a constant pressure. The reaction is continued until the consumption of hydrogen is complete. Normally the period during which hydrogen is consumed will vary from a few hours to as much as a day. After the consumption of hydrogen has ceased the pressure resistant vessel is cooled and the contents thereof are discharged, filtered and distilled to remove excess aromatic aldehydes and any other low boiling components and the product taken as a residue component which can be further refined if desired.

The following examples will serve to illustrate the practice of the invention.

*Example 1.—Preparation of benzyl aniline*

To a steel shaker bomb there were charged 123 grams (1.0 mole) of nitrobenzene, 106 grams (1.0 mole) of benzaldehyde, 150 milliliters of ethanol and 6 grams of a nickel sponge paste hydrogenation catalyst. The shaker bomb was purged three times with nitrogen and then three times with hydrogen. The contents were heated to 100° C. and hydrogen applied at a constant pressure of 75 pounds per square inch gauge until it was observed that no further hydrogen was consumed. This required about 7 hours. The contents of the bomb were then cooled and discharged and the resultant mixture filtered free of catalyst and distilled. After removal of the solvent, ethanol, and other low boiling components there were obtained 57.6 grams of benzylaniline which had a refractive index $N_D^{25}$ of 1.6165 in a 32% yield.

The above example illustrates the conventional attempt to combine the three steps into a one-step process. As may be observed a low yield of 32% of theory was obtained of a somewhat impure benzylaniline.

In another experiment substituting a nickel hydrogenation catalyst for the nickel sponge paste above, there were obtained 66 grams of benzylaniline having a refractive index of $N_D^{25}$ of 1.6083 which represented a yield of 36% of theory and an equally impure product.

*Example 2.—Preparation of benzylaniline*

To a steel shaker bomb there were charged 123 grams (1.0 mole) of nitrobenzene, 318 grams (3.0 moles) of benzaldehyde and 6 grams of a nickel hydrogenation catalyst. The shaker bomb was purged with nitrogen and then with hydrogen and hydrogen applied at a constant pressure of 75 pounds per square inch gauge while the temperature of the shaker bomb was maintained at 100° C. The reaction was continued until the consumption of hydrogen had ceased. This required about 24 hours. The contents of the bomb were cooled, discharged therefrom and filtered. A crude distillation provided 179.4 grams of a crude product of which 147.8 grams ware refractionated to yield 129.2 grams of benzylaniline which was determined to be 98.5% pure by nitrite titration. This represents, from the total, 157 grams of pure product in a yield of 86% of theory.

*Example 3.—Preparation of N-2-chlorobenzyl-4-toluidine*

To a steel shaker bomb there were charged 137 grams (1.0 mole) of para-nitrotoluene, 423 grams (3.0 moles) of ortho-chlorobenzaldehyde and 6 grams of a nickel hydrogenation catalyst. The shaker bomb was purged with nitrogen and then with hydrogen. The contents thereof were heated to 100° C. and hydrogen applied at a constant pressure of 75 pounds per square inch gauge until no further consumption of hydrogen took place. This required about 10 hours. The contents of the bomb were cooled, discharged therefrom and filtered and the product separated from the excess ortho-chlorobenzaldehyde by fractionation. The product fraction was collected at a temperature of 138–150° C. at 2 millimeters of mercury pressure. There was provided 185 grams of product which represented a yield of 80% of theory.

Various modifications of the invention will obviously occur to persons skilled in the art. Thus, it is evident that in lieu of using the compounds of the examples, any of the compounds mentioned in the specification can be employed with similar results. Therefore, it is not intended that the invention be limited in the patent granted except as necessitated by the appended claims.

What is claimed is:

1. A method for preparing a benzyl aniline which consists in reacting, in the presence of a hydrogenation catalyst, hydrogen, a nitrobenzene of the formula:

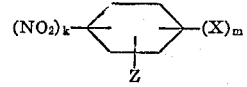

where $k$ is 1–3, $m$ is 0–3, X is methyl and Z is hydrogen, hydroxyl or amino and an excess of an aromatic aldehyde selected from

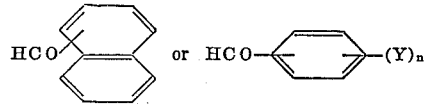

wherein $n$ is 0–2 and Y is hydrogen, chloro, bromo, methyl or methoxy.

2. The method according to claim 1 wherein the molar ratio of aromatic aldehyde to nitrobenzene is 3:1.

3. The method according to claim 2 wherein the aromatic aldehyde is benzaldehyde and the nitrobenzene is nitrobenzene.

4. The method according to claim 2 wherein the aromatic aldehyde is ortho-chlorobenzaldehyde and the nitrobenzene is para-nitrotoluene.

5. The method according to claim 2 whrein the aromatic aldehyde is naphthaldehyde and the nitrobenzene is ortho-dinitrobenzene.

6. The method according to claim 2 wherein the aromatic aldehyde is ortho-methoxybenzaldehyde and the nitrobenzene is ortho-nitrophenol.

7. The method according to claim 2 wherein the aromatic aldehyde is 2,4-dichlorobenzaldehyde and the nitrobenzene is ortho-nitroaniline.

8. A method for preparing a benzyl aniline which consists in reacting under a superatmospheric pressure and in the presence of a hydrogenation catalyst, hydrogen, a nitrobenzene of the formula:

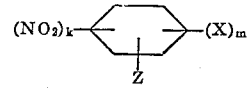

where $k$ is 1–3, $m$ is 0–3, X is methyl and Z is hydrogen, hydroxyl or amino and an excess of an aromatic aldehyde selected from

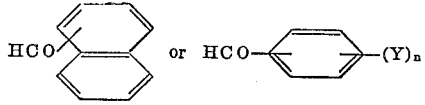

wherein $n$ is 0–2 and Y is hydrogen, chloro, bromo, methyl or methoxy.

9. The method according to claim 8 wherein the molar ratio of aromatic aldehyde to nitrobenzene is 3:1.

10. The method according to claim 9 wherein the aromatic aldehyde is benzaldehyde and the nitrobenzene is nitrobenzene.

11. The method according to claim 9 wherein the aromatic aldehyde is ortho-chlorobenzaldehyde and the nitrobenzene is para-nitrotoluene.

12. The method according to claim 9 wherein the aromatic aldehyde is naphthaldehyde and the nitrobenzene is ortho-dinitrobenzene.

13. The method according to claim 9 wherein the aromatic aldehyde is ortho-methoxybenzaldehyde and the nitrobenzene is ortho-nitrophenol.

14. The method according to claim 9 wherein the aromatic aldehyde is 2,4-dichlorobenzaldehyde and the nitrobenzene is ortho-nitroaniline.

15. The method according to claim 8 wherein the hydrogenation catalyst is a member of the group consisting of platinum, platinum oxide, platinum and palladium on charcoal and nickel and cobalt on inert supports.

References Cited by the Examiner

UNITED STATES PATENTS

| | | | |
|---|---|---|---|
| 2,965,605 | 12/1960 | Reynolds et al. | 260—557 X |
| 2,969,394 | 1/1961 | Chenicek | 260—577 |
| 2,975,213 | 3/1961 | Layer | 260—577 X |
| 3,019,262 | 1/1962 | Ambelang | 260—570.9 |

OTHER REFERENCES

Emerson et al., "Jour. Amer. Chem. Soc.," vol. 62, pages 69–70 (1940).

CHARLES B. PARKER, *Primary Examiner.*

ROBERT V. HINES, *Assistant Examiner.*